United States Patent [19]

Dulin

[11] Patent Number: 5,028,346

[45] Date of Patent: Jul. 2, 1991

[54] SEMI-CONDUCTING CERAMIC

[75] Inventor: Francis H. Dulin, Rochester Hills, Mich.

[73] Assignee: Champion Spark Plug Company, Toledo, Ohio

[21] Appl. No.: 428,305

[22] Filed: Oct. 27, 1989

Related U.S. Application Data

[63] Continuation-in-part of Ser. No. 78,561, Jul. 28, 1987.

[51] Int. Cl.$^5$ .............................................. C04B 35/56
[52] U.S. Cl. ...................... 252/62.3 C; 252/62.3 BT;
   252/516; 501/92
[58] Field of Search ............................ 501/92, 97, 98;
   252/62.3 BT, 62.3 C, 516

[56] References Cited

U.S. PATENT DOCUMENTS

| | | | |
|---|---|---|---|
| 2,636,826 | 4/1953 | Nicholson | 501/92 |
| 2,752,258 | 6/1956 | Swentzel | 501/92 |
| 3,052,814 | 9/1962 | Edwards et al. | 252/516 |
| 3,305,372 | 2/1967 | Taylor | 501/92 |
| 4,184,882 | 1/1980 | Lange | 501/92 |
| 4,332,909 | 6/1982 | Nishida et al. | 501/92 |
| 4,743,571 | 5/1988 | Steinmann | 501/97 |
| 4,795,724 | 1/1989 | Soma et al. | 501/98 |
| 4,814,301 | 3/1989 | Steinmann | 501/92 |

FOREIGN PATENT DOCUMENTS

| | | | |
|---|---|---|---|
| 54-123110 | 9/1979 | Japan | 501/92 |
| 0046973 | 5/1985 | Japan | 501/92 |
| 0612913 | 6/1978 | U.S.S.R. | 501/92 |
| 612913 | 6/1978 | U.S.S.R. | |

*Primary Examiner*—William R. Dixon, Jr.
*Assistant Examiner*—David M. Brunsman
*Attorney, Agent, or Firm*—MacMillan, Sobanski & Todd

[57] ABSTRACT

A semi-conducting ceramic is disclosed. The ceramic consists essentially of from 50 percent to 72 percent of silicon carbide particles, from 25 percent to 47 percent of silicon nitride particles and a modified silicon oxynitride glass bonded to the silicon carbide particles and bonding the silicon nitride particles together.

An improvement in a method for producing an article which comprises silicon carbide particles dispersed in a matrix is also disclosed. The method includes the step of firing or sintering the article to convert the matrix to a densified ceramic with the formation of a liquid phase. The improvement involves embedding the article, prior to firing, in a cover material which contains powdered silicon and maintaining a nitrogen or an inert atmosphere in contact with the cover material during firing. The amount of silicon in the cover material and the composition of the atmosphere are such that the silicon carbide particles are protected against oxidation.

24 Claims, No Drawings

SEMI-CONDUCTING CERAMIC

REFERENCE TO RELATED APPLICATION

This is a continuation in part of application Ser. No. 7/078,561, filed July 28, 1987, now

DEFINITIONS

As used herein, and in the appended claims, the terms "percent" and "parts" refer to percent and parts by weight, unless otherwise indicated; g means gram or grams; mg means milligram or milligrams; m means meter or meters; cm means centimeter or centimeters; mm means millimeter or millimeters; micron means $10^{-6}$ meter; ppm means parts per million; 1 means liter or liters; psi means pounds per square inch; and MPa means $10^6$ Pascals.

All temperatures herein are in degrees C., unless otherwise indicated.

All silicon carbide particle size data reported herein were taken using a Leeds & Northrup Microtrac Analyzer, Model No. 7991 SRA while other such data were taken using a Leeds & Northrup Microtrac Analyzer, Model No. 7995 SP.

BACKGROUND OF THE INVENTION

1. Field of the Invention

This invention relates to a semi-conducting ceramic which is useful in a jet engine igniter for a high energy, low voltage ignition system which includes a capacitor. A voltage applied to such an ignition system, when in operation, charges the capacitor and applies an increasing voltage to a spark gap of the igniter between a center electrode and a ground electrode. The ceramic of the instant invention is incorporated in the igniter so that a portion of a surface thereof is adjacent the spark gap. When the voltage applied to the igniter reaches a sufficiently high value, a spark discharge occurs between the center and ground electrodes of the igniter. This discharge ionizes the spark gap, thereby enabling a continuing current to flow until the capacitor in the ignition system is discharged. It is the discharge of the capacitor that makes this a "high energy" ignition system.

Igniters for use in high energy ignition systems are also known in which a portion of a surface of an insulating ceramic is adjacent the spark gap between the center and ground electrodes. Other factors being equal, when the ceramics are clean, the voltage required to initiate sparking is less when a semi-conducting ceramic is adjacent the spark gap than when an insulator is adjacent. It is the semi-conducting ceramic of the instant invention that makes an igniter produced therefrom, as described above, one of the "low voltage" type.

2. The Prior Art

Various electrically conducting ceramic bodies have heretofore been suggested and used in igniters for low voltage ignition systems; see, for example, U.S. Pat. Nos. 3,037,140 and 3,046,434 for early examples of ceramics of this type. Igniters made with these ceramics were used in engines where the operating conditions were not particularly severe. Improved semi-conductor bodies made by hot pressing mixtures of alumina and silicon carbide are disclosed in U.S. Pat. No. 3,558,959. The hot pressed alumina silicon carbide semi-conducting ceramics performed satisfactorily under more severe operating conditions, but their production proved to be complicated and expensive. For example, it was not found to be possible to produce bodies of the required shape by the hot pressing technique; instead, the extremely hard alumina silicon carbide body was shaped, after hot pressing, by boring, honing and grinding with diamond tools.

U.S. Pat. Nos. 3,968,057 and 4,120,829 disclose that a satisfactory semi-conducting ceramic can be produced without hot pressing or extensive shaping operations by pressing a batch of silicon carbide, alumina, and various calcium and magnesium compounds into a shape, and firing the shape. The method of the former patent involves two firings, a first in air, and a second in an inert atmosphere to produce the semi-conductor body. The method of the latter patent involves only a single firing, in an inert gas atmosphere.

It has also been suggested (see, for example, U.S. Pat. Nos. 3,376,367 and 3,573,231) that semi-conducting ceramics can be produced by embedding a body of a desired shape, and comprising silicon carbide and aluminum silicate or the like, in a mass of silicon carbide particles, and firing. The aluminum silicate can be a part of the batch from which the original shape is formed, charged as such, or it can be produced in situ in a shape pressed from a mixture of silicon carbide and alumina by firing the shape to oxidize a part of the silicon carbide to silicon dioxide which can then react with alumina in the shape to produce the aluminum silicate.

Finally, U.S. Pat. No. 3,052,814 suggests the production of semi-conducting ceramics by nitriding the silicon in shapes pressed from mixtures of silicon carbide and silicon. The patent also indicates that the semi-conducting ceramics can be used in the production of igniters.

SUMMARY OF THE INSTANT INVENTION

The instant invention is based upon the discovery of a new semi-conducting ceramic which comprises silicon carbide particles, silicon nitride particles and a modified silicon oxynitride glass bonded to the silicon carbide particles and bonding the silicon nitride particles together. The ceramic can be produced by pressing a shape from a batch composed of the silicon carbide particles, the silicon nitride particles and an oxygen-containing modifier which is reactive with the silicon nitride particles to produce the modified silicon oxynitride glass, and firing the shape in a relatively inert nitrogen atmosphere to a temperature sufficiently high to cause the production of an amount of the modified silicon oxynitride glass sufficient to bond to the silicon carbide particles and to bond the silicon nitride particles together.

DESCRIPTION OF THE PREFERRED EMBODIMENTS

The following Examples are presented solely for the purpose of illustrating and disclosing the invention, and are not to be construed as limiting. Example 1 constitutes the best mode presently contemplated by the inventor.

EXAMPLE 1

A semi-conducting ceramic was produced from alpha-silicon carbide, silicon nitride and magnesium oxide. A charge made up of 540 g silicon nitride, 60 g MgO and 900ml anhydrous ethyl alcohol was milled for two hours in a jar mill. A portion of the slurry from the mill which contained 486 g silicon nitride and 54 g MgO was blended with 687 g silicon carbide and 15.3 g stearic acid, and the slurry which resulted was dried, with blending, under a heat lamp, and blended to uniformity, using care throughout to avoid comminution of the silicon carbide Buttons were then pressed from 1.1 g portions of the uniform blend, using a pressure of 25,000 psi (about 172 MPa), around a central arbor having a diameter of 2.6 mm in a mold having a diameter of 9.8 mm. The buttons had a height of about 7.6 mm.

The buttons were then heated in air to a temperature of about 540°, three hours to temperature, to burn out the stearic acid, which served as a temporary, fugitive binder. They were allowed to cool to room temperature of about 20°, were packed in a powder bed mix in a graphite mold and fired to 1650° in a nitrogen atmosphere. The powder bed mix was produced from 780 g silicon nitride, 300 g boron nitride, 72 g MgO, and 48 g silicon powder by ball milling with 1600 ml anhydrous ethyl alcohol for one hour, air drying in a pan and crushing through a 20 mesh screen. About a 3 cm layer of the powder bed mix was placed in the mold, followed by the buttons and about a 6 cm layer of the mix. The mold was then placed in an electrically heated graphite furnace; the furnace was evacuated; and the buttons were fired. The firing involved:

(1) heating to 750° at about 20 per minute, and holding at 750° for one hour, while maintaining a vacuum in the furnace;
(2) establishing a nitrogen atmosphere in the furnace and heating to 1450° at 15° per minute;
(3) heating to 1650° at 5° per minute;
(4) holding at 1650° for two hours; and
(5) cooling overnight in the furnace.

The nitrogen atmosphere was maintained in the furnace throughout steps (2) through (5) of the firing.

The fired semi-conductors, which had undergone a small amount of shrinkage, were then removed from the mold, and were ground so that the bore had a diameter of 2.54 mm, the outside diameter was 9.17 mm, and the height was 6.73 mm. The resistance of the ground semi-conductor buttons, measured with a 500 volt megger between probes 3.18 mm apart, was found to range from 25 to 200 megohms, and measured across a 1.27 mm spark gap was found to range from 1 to 50 megohms.

The ground semi-conductor buttons were then placed in a sparking fixture, spring loaded in position so that a portion of one flat surface of each was in mechanical and electrical contact with the ground electrode of the fixture, and spaced by 0.01 to 0.05 mm from a center electrode thereof, spark gap 1.27 mm. The minimum voltage required to sustain sparking in an ignition circuit which included a 1.5 microfarad capacitor was found to range from 1000 to 1500 volts at one atmosphere.

The ground semi-conductor buttons were weighed carefully, placed in the sparking fixture, sparked in an ignition system which included a 6 microfarad capacitor, 2000 volts applied, 70 sparks per minute, 400 psi (about 2.76 MPa) gauge pressure, for one hour, and again weighed carefully. The weight loss from this sparking was found to range from 0.8 to 1.2 mg. The lowest weight loss any other semi-conductor buttons have shown when subjected to this test ranged from 1.8 to 2.6 mg.

Examination of the fired semi-conducting ceramic revealed that it was composed of large particles which were identified as silicon carbide crystals, agglomerates of small particles which were identified as silicon nitride crystals and a small amount of a vitreous phase which was identified as a magnesium modified silicon oxynitride glass. It was observed that the glass was bonded to the silicon carbide particles and bonded the silicon nitride particles together. Silicon carbide constituted substantially 56 percent of the fired ceramic. On the basis of equilibria studies reported in the literature, it is estimated by the Lever Rule Principal that silicon nitride constituted about 27 percent and the magnesium modified oxynitride glass about 17 percent of the fired ceramic. The ceramic was found to have an apparent pososity ranging from 25 to 30 percent.

Alpha silicon carbide is known to crystallize into several polytypes with hexagonal symmetry, while beta silicon carbide is known to crystallize with cubic symmetry. The silicon carbide used in the procedure described above was green material, predominantly, as determined by x-ray diffraction analysis, hexagonal, with the possibility of some cubic. The hexagonal has the 6H polytype (85-95%) and the balance 15R and other minor polytypes, where the H and R refer to hexagonal and rhombohedral symmetry, respectively, while the numbers refer to the quantity of unit cells of each symmetry in a stack; the stacks alternate within a single crystal. In the case of the 6H polytype, there are three 2H unit cells in a stack. While the indicated material was used in Example 1, other polytypes and proportions of polytypes have been found to be operable. The presence of cubic silicon carbide is indeterminate by Xray diffraction due to interference reflections. The average particle size of the silicon carbide used in the procedure described above was 12.2 microns, standard deviation 7.1 microns; 90 percent was finer than 21.9 microns; 50 percent was finer than 10.9 microns; and 10 percent was finer than 4.1 microns. The measured particle size distribution of the silicon carbide was as follows:

| Particle Size, microns | Percent |
|---|---|
| 44 | 0.8 |
| 31 | 9.0 |
| 22 | 15.2 |
| 16 | 24.4 |
| 11 | 22.2 |
| 7.8 | 11.4 |
| 5.5 | 8.3 |
| 3.9 | 5.1 |
| 2.8 | 3.7 |

It has been found that the voltage required to initiate a spark (termed "onset spark voltage requirement") in an igniter wherein a spark discharge occurs along a surface of a semi-conducting ceramic according to the invention is a function of the proportions of coarse and fine silicon carbide in the ceramic, the higher the content of coarser silicon carbide crystals, the lower the onset spark voltage requirement, and vice versa. As a consequence, the proportions of coarse and fine silicon carbide can be controlled to meet the needs of a particular igniter and ignition source.

The magnesium oxide used in the procedure described above contained more than 99.6 percent MgO, fewer than 200 parts per million of Na, fewer than 100 parts per million of Ca, and fewer than 50 parts per million of Si, Fe and K. It had a surface area of 30 m$^2$ per g and an ultimate particle size of about 0.5 to 3 microns.

The silicon nitride used in the procedure described above was more than 90 percent α silicon nitride. It had a mean particle size of 0.50 micron and a surface area of 21.0 m$^2$ per g. It was reported to have a nitrogen content of 38.64 percent and an oxygen content of 1 percent. It is estimated that, prior to sintering, as a consequence of its processing, the silicon nitride may have carried as much as 2.2 percent of oxygen. This makes the oxygen content of the silicon nitride equivalent to about 4 percent of $SiO_2$, which can be incorporated in the liquid phase during sintering and remain in the glass phase after cooling. It will be appreciated that one or more components, compounds or phases thereof may crystallize from the glass phase during cooling, as dictated by equilibrium conditions.

The jar in which the magnesium oxide and the silicon nitride were milled in the procedure described above was a 90 percent $Al_2O_3$ jar which had a capacity of substantially 7 l. In addition to the magnesium oxide and the silicon nitride the jar contained 6,000 g of 90 percent $Al_2O_3$ balls which ranged in size from 12 to 19 mm. Attrition of the balls and of the mill made a minor contribution to the glass phase during sintering.

In the procedure described above, the stearic acid was added as a solution prepared by making an addition of 15.3 g acid to 61.2 g anhydrous ethyl alcohol and warming until dissolution was accomplished.

As is stated above, the foregoing procedure constitutes the best mode presently contemplated by the inventor. It will be appreciated that there are processing advantages to using spray drying to produce the batch that is pressed to the desired shape. It has been found, however, that spray drying introduces small variations in the properties of the semi-conducting ceramic. So far as is known, if a final spray drying step is used to produce the batch that is pressed and fired to produce the instant ceramic, it is not possible to achieve the degree of uniformity that can be achieved by the method described above.

Semi-conducting ceramics according to the invention which are buttons having relatively complex configurations can be produced using contoured grinding wheels to shape the unfired bodies, preferably after the temporary binder has been burned off. The shape to which the unfired bodies are ground must be such that the fired bodies, after the shrinkage which takes place during firing, have the desired configuration.

Semi-conductor buttons according to the instant invention can also be shaped to a desired configuration by other methods, including injection molding and pressure or slip casting, etc.

It has been found that semi-conducting ceramics according to the invention can be produced even when there are substantial variations from the best mode described above. For example, the proportions in which silicon carbide and silicon nitride are used can be varied substantially; the particle size of the batch materials can be changed; black (less pure) silicon carbide can be used instead of the green; other crystalline polytypes of alpha silicon carbide can be used; and other modifiers (sintering aids) can be substituted for the magnesium oxide (as in the procedures described below as Examples 2, 3 and 4). The sizing of the silicon carbide used as described in the foregoing example was substantially optimum. Its mean diameter was 12.2 microns; the standard deviation was 7.1; and 50 percent of the material was finer than 10.9 microns. It is usually preferred that the mean diameter be from 7 to 17 microns, and that the standard deviation be not greater than 15 microns. Most desirably, the standard deviation is not greater than 10 microns.

EXAMPLES 2, 3, 4, 5 and 6

The procedure of Example 1 has been repeated to produce ceramic materials from different batches; examples of different charges that were wet milled as described in Example 1 are set forth in the following table, where composition is given in parts.

|  | Example | | | | |
| --- | --- | --- | --- | --- | --- |
|  | 2 | 3 | 4 | 5 | 6 |
| silicon nitride | 564 | 552 | 540 | 540 | 540 |
| yttrium oxide | 28.8 | 38.4 | 48 | — | — |
| aluminum oxide | 7.2 | 9.6 | 12 | — | — |
| $La_2O_3$ | — | — | — | 39.6 | 34.2 |
| $CeO_2$ | — | — | — | 0.4 | 9.0 |
| $Nd_2O_3$ | — | — | — | 14.7 | 12.0 |
| $Pr_2O_3$ | — | — | — | 4.8 | 4.2 |

Buttons were then produced as described in Example 1 from blends of portions of the slurries with 687 g silicon carbide and 15.3 g stearic acid. In the case of Examples 2 and 3, the portion of the slurry blended with silicon carbide and stearic acid contained 507.6 g and 496.8 g silicon nitride, respectively, while, in the case of Examples 4, 5 and 6, the portion of the slurry blended contained 486 g silicon nitride.

The following properties, determined as described above, of ground semi-conductor buttons of Examples 2-6 are reported in the table below: the resistance R (megohms) measured across a 1.27 mm spark gap, the apparent porosity, P, in percent, the onset spark voltage requirement, V, in volts, and the erosion rate, E, in mg per hour.

|  | Example | | | | |
| --- | --- | --- | --- | --- | --- |
|  | 2 | 3 | 4 | 5 | 6 |
| R | 2.1 | 1 | 0.50 | 0.85 | 0.75 |
| P | 23.61 | 22.17 | 21.91 | 24.23 | 25.40 |
| V | 930 | 940 | 870 | 870 | 950 |
| E | 1.3 | 1.3 | 1.2 | 1.2 | 1.3 |

Petrographic examination of the fired semi-conducting ceramics of Examples 2, 3 and 4 indicated that they were composed of large particles which were identified as silicon carbide crystals, agglomerates of small particles which were identified as silicon nitride crystals and a small amount of a dense glassy phase which is an yttrium-aluminum modified silicon oxynitride glass. Several excessively large pockets of the silicon nitride agglomerates were observed, indicating that better mixing of the batch ingredients would be desirable, but, nevertheless, the outstanding test results reported above were achieved. The glass is bonded to the silicon carbide particles and bonds the silicon nitride particles together. Silicon carbide constituted substantially 56 percent of the fired ceramic.

Petrographic examination of the fired semi-conducting ceramics of Examples 5 and 6 revealed that they were composed of large particles which were identified as silicon carbide crystals and agglomerates of small particles which were identified as silicon nitride crystals densely bonded in a manner similar to that observed in the ceramics produced as described in the other examples. As was the case with the ceramics produced as described in Examples 2-4, several excessively large pockets of the silicon nitride agglomerates were observed, indicating that better mixing of the batch ingredients would be desirable, but, nevertheless, the outstanding test results reported above were achieved. The glassy phase is a silicon oxynitride glass modified by a complex rare earth oxide.

The silicon carbide and the silicon nitride materials used as described above in Examples 2-6 were identical to those used as described in Example 1.

The yttrium oxide used as described above in Examples 2-4 contained more than 99.9 percent of $Y_2O_3$, fewer than 10 ppm $Fe_2O_3$ and 1180 ppm other rare earth oxides. It had a calculated surface area of 1-2 $m^2/g$, an average particle size of 6.2 $\mu m$, $D_{50}$ 5.41 $\mu m$, $D_{90}$ 11.9 $\mu m$ and $D_{10}$ 1.7 $\mu m$.

The aluminum oxide used as described above in Examples 2-4 contained more than 99.5 percent of $Al_2O_3$, 0.06-0.10 percent of $Na_2O$, 0.05-0.12 percent of $SiO_2$, and 0.01-0.02 percent of $Fe_2O_3$. It had a calculated surface area of 8-10 $m^2/g$, and an average particle size of 1.92 $\mu m$, $D_{10}$ 0.37 $\mu m$, $D_{50}$ 0.94 $\mu m$ and $D_{90}$ 5.02 $\mu m$.

The lanthanum oxide, the cerium oxide, the neodymium oxide and the praseodymium oxide used as described above in Examples 5 and 6 were added to the batch as mixtures of these oxides which are commercially available under the trade designations "Lanthanide #5232" and "Lanthanide #5236", which have the compositions in percent, calculated surface areas in $m^2/g$, set forth in the following table:

|  | Lanthanide 5232 | Lanthanide 5236 |
| --- | --- | --- |
| $La_2O_3$ | 66.0 | 57.0 |
| $CeO_2$ | 0.7 | 15.0 |
| $Nd_2O_3$ | 24.5 | 20.0 |
| $Pr_2O_3$ | 8.0 | 7.0 |
| Other | 0.8 | 1.0 |
| Calculated surface area, $m^2/g$ | 1.4 | 0.9 |
| Average particle size, $\mu m$ | 11.6 | 15.8 |

Example 4 was repeated, except that the wet milling was in water, and a polyglycol having a molecular weight of about 600 (the polyglycol that was used is commercially available under the trade designation "CARBOWAX 600") was used instead of stearic acid as a temporary binder, the ball milled slurry was spray dried, rather than being dried under heat lamps, and the packing bed material in which the shaped buttons were embedded before they were fired was spray dried. Ground semi-conductor buttons produced from the resulting ceramics were found to have the following properties, determined as described above: resistance, measured across a 1.27 mm spark gap, 0.200 megohm, apparent porosity 18.25 percent, onset spark voltage requirement 990 volts, and erosion rate 1.2 mg per hour.

Example 4 was also repeated, except that the wet milling was in water, the polyglycol that is commercially available under the trade designation "CARBOWAX 600" was used instead of stearic acid as a temporary binder, the ball milled slurry was spray dried, rather than being dried under heat lamps, and the packing bed material in which the shaped buttons were embedded before they were fired was composed of 74 parts $Si_3N_4$, 25 parts BN and 3 parts Si and was spray dried. Ground semi-conductor buttons produced from the resulting ceramics were found to have the following properties, determined as described above: resistance, measured across a 1.27 mm spark gap, >200 megohms, apparent porosity 23.57 percent, onset spark voltage requirement 2230 volts, and erosion rate 1.4 mg per hour.

In general, silicon carbide can vary in a ceramic according to the invention from 50 to 72 percent, silicon nitride can vary from 25 to 47 percent, and the amount of the modified silicon oxynitride glass must be sufficient that it provides the desired mechanical strength, usually at least about 8 percent, but not so great that the bodies deform during firing or have too low a porosity (which has been found to cause a diminished resistance to erosion), usually at least about 18 percent. Preferably, silicon carbide ranges from 54 to 65 percent, silicon nitride is from 29 to 40 percent, and the modified silicon oxynitride glass is from 10 to 18 percent. Silicon nitride having a lower specific surface area of 10 to 15 $m^2$ per g, when substituted for that used as described in Example 1, was found to be less reactive and to produce less glass when the bodies were fired to 1650°.

It will be appreciated that, in the procedure described in Example 1, the magnesium oxide reacted with a part of the silicon nitride during firing, forming the magnesium modified silicon oxynitride glass. This glass, under the firing conditions described in Example 1, had a sufficiently low viscosity that it was capable of flowing to such an extent that it wet the silicon nitride and silicon carbide particles and, as it contracted during cooling, drew them into a denser ceramic structure. The small particle size of the magnesium oxide contributed a high rate of reaction and enabled formation of the modified glass at a comparatively rapid rate; however, an even finer magnesium oxide of the same purity (one which had a surface area of 125 $m^2$ per g) was not found to be superior to that identified above. Magnesium hydroxide has been found to be a full equivalent for magnesium oxide in this respect when used in an appropriate quantity to compensate for the water which it loses during sintering. In addition, magnesium oxide can be replaced with other modifiers for the silicon oxynitride glass. For example, spinel ($MgO.Al_2O_3$) has been substituted, but is slightly less effective at reducing the viscosity of the modified oxynitride glass, so that an increased firing temperature is indicated; however, spinel is less volatile than magnesium oxide and, therefore, a batch containing spinel can tolerate a higher firing temperature. In addition, MgO and $Al_2O_3$ in different proportions than those in which they are present in spinel, as well as BeO, SrO and $ZrO_2$ are capable of forming modified silicon oxynitride glasses, and can be used; equivalent or higher firing temperatures should be required to achieve the requisite fluidity.

In a like manner, in the procedures described in Examples 2, 3 and 4, the yttrium and aluminum oxides and, in the Example 5 and 6 procedures the lanthanum, cerium, neodymium and praseodymium oxides reacted with a part of the silicon nitride during firing, forming modified silicon oxynitride glasses. These glasses, under the firing conditions described in Examples 2 through 6, had a sufficiently low viscosity that they were capable of flowing to such an extent that they wet the silicon nitride and silicon carbide particles and, as they contracted during cooling, drew them into denser ceramic structures. Finally, other rare earth oxides or mixtures can be used, alone or with $Al_2O_3$ or the other oxides listed above. For example, $Y_2O_3$, either alone or mixed with other rare earth oxides, can be used with the oxides other than $Al_2O_3$ listed above, and $La_2O_3$ and $CeO_2$, alone or mixed with one another or with other rare earth oxides can be used with $Al_2O_3$ or the other oxides listed above. The volatilities of $CeO_2$, $BeO$, $Y_2O_3$, $La_2O_3$, $Al_2O_3$ and $ZrO_2$ are all sufficiently low that batches containing them should be capable of withstanding the increased firing temperatures required to form the modified silicon oxynitride glasses. Other oxide modifiers than those mentioned above will be apparent to those skilled in the art of sintering materials of these types. Additions of up to 6 percent of $SiO_2$ can be made to increase the oxygen content for lower sintering temperatures. It is usually preferred that a ceramic according to the instant invention contain from 3 to 15 percent of one of the foregoing oxide modifiers or of a mixture of two or more thereof.

The firing temperature is not limited to the 1650° temperature of the procedure of the foregoing Example. Instead, temperatures ranging from 1550 to 2000 would be operable when the modifying oxides are adjusted to control the amount of glass to the preferred level. In addition, it can be appreciated that the gas pressure can be increased above atmospheric to suppress volatilization and thermal decomposition of silicon nitride. This will make it possible to use less sintering additive and higher temperatures (1800 and above). In some instances, the need for the use of a cover powder can be obviated by the use of a gas overpressure.

The loss of MgO by volatilization can be suppressed by covering the pressed, formed parts during sintering with a powder of silicon nitride containing some MgO, typically an amount close to that in the parts being sintered. The parts covered with the powder can be sintered in a graphite mold or crucible having a loose fitting graphite cover. To facilitate easy removal of the covering powder from the parts, after sintering, the amount of MgO used should be sufficiently small to avoid the formation of a hard sinter cake in the powder. It has been found that powdered boron nitride, if added to the powder, does not react with the silicon nitride or the MgO, and inhibits sintering of the powder, assisting, as a consequence, in the separation of the sintered parts from the powder. The covering powder can be re-used if MgO is added thereto as required to compensate for losses by volatilization.

The presence of a small amount of free silicon in the covering powder has been found to minimize decomposition of the silicon nitride and oxidation of the silicon carbide crystal surfaces in the parts being sintered and, therefore, to be beneficial. Therefore, a preferred covering powder is composed of 65 parts of silicon nitride, 25 parts of boron nitride, 6 parts of MgO and 4 parts of silicon. Silicon powders having a range of particle sizes are operable; 50 percent of that used in the procedure described in Example 1 was finer than 22 microns. The silicon should be sufficiently fine to provide good dispersion throughout the powder bed, but not so fine as to react entirely with the nitrogen gas at a low temperature, pre-empting melting and vaporizing in the powder bed. A small amount of silicon, from 1 to 8 percent, has been found to be suitable. The use of silicon metal powder in a cover layer is generally operable to minimize oxidation of silicon carbide particles during firing, whether they are present in bodies which mature because of the formation of a liquid vitreous phase as in the foregoing Examples or in bodies which mature by sintering, e.g., of silicon nitride particles or in bodies which mature by chemical reaction, as in reaction bonded silicon nitride bodies, or in bodies which mature by a combination of chemical reaction and subsequent sintering.

The silicon nitride used in the covering powder need not be as pure or as small in average particle size as that employed as described in Example 1, although the material there described is operable. Material with a particle size essentially through a 325 mesh screen, or averaging 10 microns, is satisfactory. Very fine particle sizes enhance reactivity and sintering, but sintering is not desirable in the cover powder because it is desired to remove the parts therefrom. Similarly, the MgO described in Example 1 is operable, but lower purity material can also be used, and boron nitride powders having a broad range of particle sizes are operable. Indeed, the composition of the cover powder can vary broadly, and other known cover materials can also be employed, and the addition of powdered silicon thereto is advantageous, as set forth above.

It will be apparent that various changes and modifications can be made from the specific details of the instant invention as described above without departing from the spirit and scope thereof as defined in the appended claims and that, in its essential details, the invention is a new semi-conducting ceramic which consists essentially of from 50 percent to 72 percent of silicon carbide particles, from 25 percent to 47 percent of silicon nitride particles and a modified silicon oxynitride glass bonded to the silicon carbide particles and bonding the silicon nitride particles together. Preferably, it is a magnesium modified silicon oxynitride glass, an yttrium-aluminum modified glass or a lanthanum-cerium-neodymium-praseodymium modified glass that is bonded to the silicon carbide particles and that bonds the silicon nitride particles together. Preferably, also, the mean particle size of the silicon carbide is from 7 to 17 microns, the standard deviation is not greater than 10 microns, and the silicon nitride has a surface area of at least 14, most desirably at least 20, $m^2$ per g. A gas pressurizing furnace can be used to produce ceramics according to the invention, in which case many of the reasons for packing the green ceramics in a powder bed prior to firing are eliminated.

I claim:

1. A semi-conducting ceramic which consists essentially of from 50 percent to 72 percent of silicon carbide particles, from 25 percent to 47 percent of silicon nitride particles and a modified silicon oxynitride glass bonded to the silicon carbide particles and bonding the silicon nitride particles together, said ceramic having a weight loss by erosion, when subjected to spark discharges along its surface between electrodes having a spark gap of 1.27 mm in an ignition system which includes a 6 microfarad capacitor, 2000 volts applied, 70 sparks per minute, pressure 400 psi gauge, less than 1.8 mg per hour.

2. A semi-conducting ceramic as claimed in claim 1 wherein the silicon carbide constitutes from 54 percent to 65 percent, the silicon nitride constitutes from 29 percent to 40 percent, and the modified silicon oxynitride glass constitutes from 8 percent to 22 percent.

3. A semi-conducting ceramic as claimed in claim 2 wherein the glass is a magnesium modified oxynitride glass.

4. A semi-conducting ceramic as claimed in claim 3 wherein the silicon carbide has a mean diameter of from 7 to 17 microns.

5. A semi-conducting ceramic as claimed in claim 4 wherein the standard deviation from the mean particle diameter is not greater than 15 microns.

6. A semi-conducting ceramic as claimed in claim 1 which has an open porosity from 18 to 35 percent.

7. A semi-conducting ceramic as claimed in claim 1 which has an open porosity from 25 to 30 percent.

8. A semi-conducting ceramic as claimed in claim 2 wherein the glass is a magnesium, aluminum modified oxynitride glass.

9. A semi-conducting ceramic as claimed in claim 2 wherein the glass is a rare earth, aluminum modified oxynitride glass.

10. A semi-conducting ceramic as claimed in claim 2 which contains from 3 to 15 percent of MgO, $Al_2O_3$, $SiO_2$, $CeO_2$, $Y_2O_3$, $La_2O_3$ $ZrO_2$, SrO, BeO or a mixture of two or more of the foregoing oxide modifiers.

11. A semi-conducting ceramic as claimed in claim 8 wherein the silicon carbide has a mean diameter of from 7 to 17 microns.

12. A semi-conducting ceramic as claimed in claim 11 wherein the standard deviation from the mean particle diameter is not greater than 15 microns.

13. A semi-conducting ceramic as claimed in claim 3 which has an open porosity from 18 to 35 percent.

14. A semi-conducting ceramic as claimed in claim 3 which has an open porosity from 25 to 30 percent.

15. A semi-conducting ceramic as claimed in claim 8 which has an open porosity from 18 to 35 percent.

16. A semi-conducting ceramic as claimed in claim 8 which has an open porosity from 25 to 30 percent.

17. A semi-conducting ceramic as claimed in claim 9 wherein the silicon carbide has a mean diameter of from 7 to 17 microns.

18. A semi-conducting ceramic as claimed in claim 17 wherein the standard deviation from the mean particle diameter is not greater than 15 microns.

19. A semi-conducting ceramic as claimed in claim 9 which has an open porosity from 18 to 35 percent.

20. A semi-conducting ceramic as claimed in claim 9 which has an open porosity from 25 to 30 percent.

21. A semi-conducting ceramic as claimed in claim 10 wherein the silicon carbide has a mean diameter of from 7 to 17 microns.

22. A semi-conducting ceramic as claimed in claim 21 wherein the standard deviation from the mean particle diameter is not greater than 15 microns.

23. A semi-conducting ceramic as claimed in claim 10 which has an open porosity from 18 to 35 percent.

24. A semi-conducting ceramic as claimed in claim 10 which has an open porosity from 25 to 30 percent.

* * * * *